(12) United States Patent
Limon Petersen et al.

(10) Patent No.: US 11,692,962 B2
(45) Date of Patent: *Jul. 4, 2023

(54) MEASURING ELEMENT FOR ANION-SENSITIVE SOLID-CONTACT ELECTRODE AND ION-SENSITIVE SOLID-CONTACT ELECTRODE

(71) Applicant: Mettler-Toledo GmbH, Greifensee (CH)

(72) Inventors: Juan Limon Petersen, Zürich (CH); Andreas Rutz, Zürich (CH)

(73) Assignee: METTLER-TOLEDO GMBH, Greifensee (CH)

(*) Notice: Subject to any disclaimer, the term of this patent is extended or adjusted under 35 U.S.C. 154(b) by 0 days.

This patent is subject to a terminal disclaimer.

(21) Appl. No.: 17/583,745

(22) Filed: Jan. 25, 2022

(65) Prior Publication Data

US 2022/0146448 A1    May 12, 2022

Related U.S. Application Data

(63) Continuation of application No. 16/381,145, filed on Apr. 11, 2019, now Pat. No. 11,262,328, which is a
(Continued)

(30) Foreign Application Priority Data

Oct. 13, 2016   (EP) ..................... 16193653

(51) Int. Cl.
*G01N 27/333* (2006.01)
*G01N 27/30* (2006.01)
(Continued)

(52) U.S. Cl.
CPC .......... *G01N 27/333* (2013.01); *G01K 13/00* (2013.01); *G01N 27/302* (2013.01); *G01N 27/36* (2013.01)

(58) Field of Classification Search
CPC .... G01N 27/333; G01N 27/302; G01N 27/36; G01K 13/00
See application file for complete search history.

(56) References Cited

U.S. PATENT DOCUMENTS

| 4,133,735 A | 1/1979 | Afromowitz et al. |
| 4,280,889 A | 7/1981 | Szonntagh |
| (Continued) | | |

FOREIGN PATENT DOCUMENTS

| CN | 103424450 A | 12/2013 |
| CN | 104300102 A | 1/2015 |
| (Continued) | | |

OTHER PUBLICATIONS

Office Action (Notice of Reasons for Rejection) dated Aug. 30, 2021, by the Japanese Patent Office in corresponding Japanese Patent Application No. 2019-519998, and an English Translation of the Office Action. (11 pages).
(Continued)

*Primary Examiner* — Joshua L Allen
(74) *Attorney, Agent, or Firm* — Buchanan Ingersoll & Rooney PC

(57) ABSTRACT

A measuring element is disclosed for an ion-sensitive solid-contact electrode for measuring ion activity in a measurement medium. An ion-sensitive solid-contact electrode having such a measuring element and an electrochemical sensor having such a solid-contact electrode are also disclosed. The measuring element can include an ion-sensitive layer arranged to contact a measurement medium when in operation, and conductive to lithium ions; and a single-phase electrically conductive layer, which includes metallic lithium or a lithium-(0)-alloy. A solid-state electrolyte layer can be arranged between the ion-sensitive layer and the electrically conductive layer.

19 Claims, 4 Drawing Sheets

Related U.S. Application Data continuation of application No. PCT/EP2017/076165, filed on Oct. 13, 2017.

(51) Int. Cl.
  *G01N 27/36* (2006.01)
  *G01K 13/00* (2021.01)

(56) References Cited

U.S. PATENT DOCUMENTS

| | | | |
|---|---|---|---|
| 4,632,732 | A | 12/1986 | Fog et al. |
| 8,999,127 | B2 | 4/2015 | Mazellier |
| 11,262,328 | B2 * | 3/2022 | Limon Petersen .. G01N 27/333 |
| 2005/0263798 | A1 | 12/2005 | Kurth et al. |
| 2010/0181528 | A1 | 7/2010 | Richardson |
| 2011/0162962 | A1 | 7/2011 | Mazellier |
| 2015/0024256 | A1 | 1/2015 | Anandan et al. |
| 2017/0168008 | A1 | 6/2017 | Krogmann |
| 2017/0261461 | A1 | 9/2017 | Bychkova et al. |
| 2019/0234899 | A1 | 8/2019 | Limon Petersen et al. |

FOREIGN PATENT DOCUMENTS

| | | |
|---|---|---|
| DE | 2538739 A1 | 3/1976 |
| DE | 3727485 A1 | 3/1988 |
| DE | 19620568 A1 | 11/1997 |
| DE | 19714474 C2 | 2/2002 |
| DE | 10018750 C2 | 3/2003 |
| EP | 0382846 A1 | 8/1990 |
| EP | 0420983 A1 | 4/1991 |
| JP | S5244692 A | 4/1977 |
| JP | S59500386 A | 3/1984 |
| JP | H03501405 A | 3/1991 |
| JP | H06249823 A | 9/1994 |
| JP | 2005281824 A | 10/2005 |
| JP | 2011137820 A | 7/2011 |
| WO | 0104615 A1 | 1/2001 |
| WO | 2016069935 A1 | 5/2016 |

OTHER PUBLICATIONS

Second Office Action dated Aug. 23, 2021, by the Chinese Patent Office in corresponding Chinese Patent Application No. 201780063280.2, and an English Translation of the Office Action. (12 pages).

Extended European Search Report issued in corresponding European Patent Application No. 16193653.9, 8 pages (dated May 5, 2017).

International Search Report (with English translation) and Written Opinion issued in corresponding International Patent Application No. PCT/PCT/EP2017/076165, 14 pages (dated Dec. 22, 2017).

First Office Action with Search Report dated Mar. 11, 2021 in corresponding Chinese Patent Application No. 201780063280.2 with English translation, 15 pages.

Kreuer et al. (DE 3727485 A1, machine translation) (Year:1986).

* cited by examiner

MEASURING ELEMENT FOR ANION-SENSITIVE SOLID-CONTACT ELECTRODE AND ION-SENSITIVE SOLID-CONTACT ELECTRODE

RELATED APPLICATION

This application claims priority as a U.S. continuation patent application of U.S. patent application Ser. No. 16/381,145, filed Apr. 11, 2019, which is a continuation application under 35 U.S.C. § 120 to PCT/EP2017/076165, which was filed as an International Application on Oct. 13, 2017 designating the U.S., and which claims priority to European Application 16193653.9 filed in Europe on Oct. 13, 2016. The entire contents of these applications are hereby incorporated by reference in their entireties.

FIELD

A measuring element is disclosed for an ion-sensitive solid-contact electrode for measuring ion activities, as well as an ion-sensitive solid-contact electrode having a measuring element, such as a pH solid-contact electrode.

BACKGROUND INFORMATION

Glass electrodes having a thin ion-sensitive glass membrane have been used in the laboratory and in process plants to measure ion activities such as pH. As a thin-walled closure, the ion-sensitive glass membrane can be fused to an electrode shaft made of insulating glass, wherein the expansion coefficients used for the electrode shaft and the glass membrane are similar.

Such ion-sensitive glass electrodes may be used as the measurement electrode together with a reference electrode that may be used as an electrochemical sensor, wherein the measurement electrode and the reference electrode may be configured as separate elements or as a so-called combination electrode accommodated in a shared housing.

During operation and/or during a measurement, the outer surface of the glass membrane comes in contact with the measurement medium or the measurement solution, and the inner surface is in contact with an electrolyte solution as the reference solution. By replacing alkali ions of the glass with hydrogen ions (H+), thin gelatinous silicate swelling layers are formed on the outside of the glass membrane. Due to differences in chemical potentials of H+ ions between the swelling layer and the adjacent solution, a Galvani voltage develops on each side of the glass membrane due to passage of H+ ions through the solution/swelling layer phase boundary. The total of these galvanization voltages yields the glass electrode voltage that can be measured between the measurement medium and the electrolyte, with the two reference electrodes as the inner lead and the outer lead.

Ion-sensitive glass electrodes as well as sensors having ion-sensitive glass electrodes can have good measurement properties. For example, glass electrodes used to measure pH can have reliable slope, long-term stability, selectivity and limit of detection. However, known glass electrodes can only be used in a predetermined orientation. Furthermore, glass electrodes have mechanical issues, such as being fragile and easily breakable, as a result of which glass splinters can, for example, contaminate a measurement medium.

Known attempts to manufacture ion-sensitive solid-contact electrodes or ion-sensitive solid-state electrodes have not been successful because when such electrodes are used to measure ion activity, their performance has been inferior and/or they can be used only with certain restrictions such as, for example, with respect to covering the pH measurement range or the pressure and/or temperature stability.

DE 196 20 568 A1 discloses a pH glass electrode with a two-layer glass membrane, having an interior coated with silver and being filled with an elastic material to address mechanical stability of the electrode. The two-layer glass membrane includes (e.g., consists of) an ion-conductive glass layer in contact with a medium and an electrically conductive and ion-conductive glass layer on the interior.

WO 1/04615 A1 discloses an ion-sensitive solid-state electrode having a glass membrane and a metallic core, which is also sealed with a stopper made of an electrically conductive metal. For example, one electrode described has a lithium-containing glass membrane, a lithium-led alloy as the metallic core, and a stopper made of a so-called Wood alloy.

U.S. Pat. No. 4,632,732 A discloses an ion-sensitive pH electrode having an intermediate layer between the ion-sensitive glass membrane and the electric contact, the intermediate layer being contacted by electrically conductive silver epoxy. The intermediate layer includes (e.g., consists of) lithium-vanadium oxide, which is permanently bonded to the glass membrane by sintering.

DE 197 14 474 C2 discloses an electrochemical sensor produced by a thick-film technique. A metal electrode of gold, platinum, a gold-silver alloy or a platinum-silver alloy is deposited on a steel ceramic substrate by a screen-printing technology, and then at least one glass composition is applied as the ion-sensitive glass membrane.

DE 100 18 750 C2 discloses a solid-contacted ion-sensitive glass electrode, in which a polymer contact layer having an intrinsically conductive organic polymer that adheres both to the glass membrane and to the tap line is applied to the glass membrane's interior.

U.S. Pat. No. 4,133,735 A discloses a planar pH electrode. A conductive layer in thin-film or thick-film technology is applied to a forsterite wafer and then a layer of pH glass in thick-film technology is applied to at least a portion of this conductive layer. The conductive layer includes (e.g., consists of) chromium, nickel, gold, silver or a gold-platinum mixture. In addition, a lead or a tap line or an FET (field effect transistor) can be bonded to the conductive layer. In order to preclude the conductive layer from contacting the measurement medium, the electrode is sealed with respect to the measurement medium, except for the glass membrane.

U.S. Pat. No. 4,280,889 A discloses a multilayer electrode for measuring the ion concentration, whereupon an electrically conductive structure of successive layers of chromium and silver is applied to an insulating substrate, such as ceramic or glass. A solid electrolyte layer of silver chloride and an outer ion-sensitive glass layer, such as a pH glass, is applied over the conductive structure. At least the glass layer is applied by RF sputtering.

EP 0 420 983 A1 discloses an ion-sensitive solid-phase electrode having an ion-sensitive glass membrane, whose glass composition contains lanthanum and neodymium. A solid phase contact is applied to the glass membrane, such as an oxide compound of the formula $M_xLa_yNd_zWO_3$, where M is an alkali metal or alkaline earth metal and $0<x+y+z<1$. The solid-phase contact is in turn connected to a lead wire.

DE 37 27 485 A1 discloses a solid-state conductive system for use with an ion-sensitive element for electrochemical sensors, wherein a multiphase solid contact material is provided between an electric conductor element and the ion-sensitive element. The conductive system includes an ion-conducting intermediate layer (e.g., CsHSO4), which reduces the internal resistance of the system. A multiphase system including (e.g., consisting of) lithium (Li) and tin (Sn), having a tin phase with lithium dissolved in it and an intermetallic phase (e.g., LixSny), is used as contact material. Because of the solubility of LixSny in Sn, the activity of lithium in tin and the potential of the tap line system should be stabilized. However, the lithium solubility is a function of temperature, so the thermodynamic equilibrium changes as a function of temperature. When used in an electrochemical sensor, this results in a prolonged rise time or drift when there are changes in temperature.

An enameled pH electrode distributed by Pfaudler, Germany represents one of the few technologies used commercially for an ion-sensitive solid-state electrode. However, this cannot be used over an entire pH range, and furthermore, it is expensive in comparison with traditional glass electrodes.

Attempts have not yet been successful to develop an ion-sensitive solid contact electrode for measuring ion activity, with comparable or better measurement properties than the known ion-sensitive glass electrodes. For example, it has not yet been possible to achieve a conductive transition from a measurement solution to the glass membrane and a solid-phase electrode to a tap wire in a satisfactory and long-lasting manner.

SUMMARY

A measuring element is disclosed for an ion-sensitive solid-contact electrode for measuring ion activity in a measurement medium, the measuring element comprising: an ion-sensitive layer arranged to contact a measurement medium when in operation, and conductive for lithium ions; and a single-phase electrically conductive layer, which includes metallic lithium or a lithium-(0)-alloy, wherein the measuring element is a solid-state measuring element which includes a solid-state electrolyte layer arranged between the ion-sensitive layer and the electrically conductive layer.

BRIEF DESCRIPTION OF THE DRAWINGS

Various embodiments are described in greater detail below with respect to the figures, wherein the same elements are labeled with the same or similar reference numerals, and wherein.

DETAILED DESCRIPTION

Figure 1:
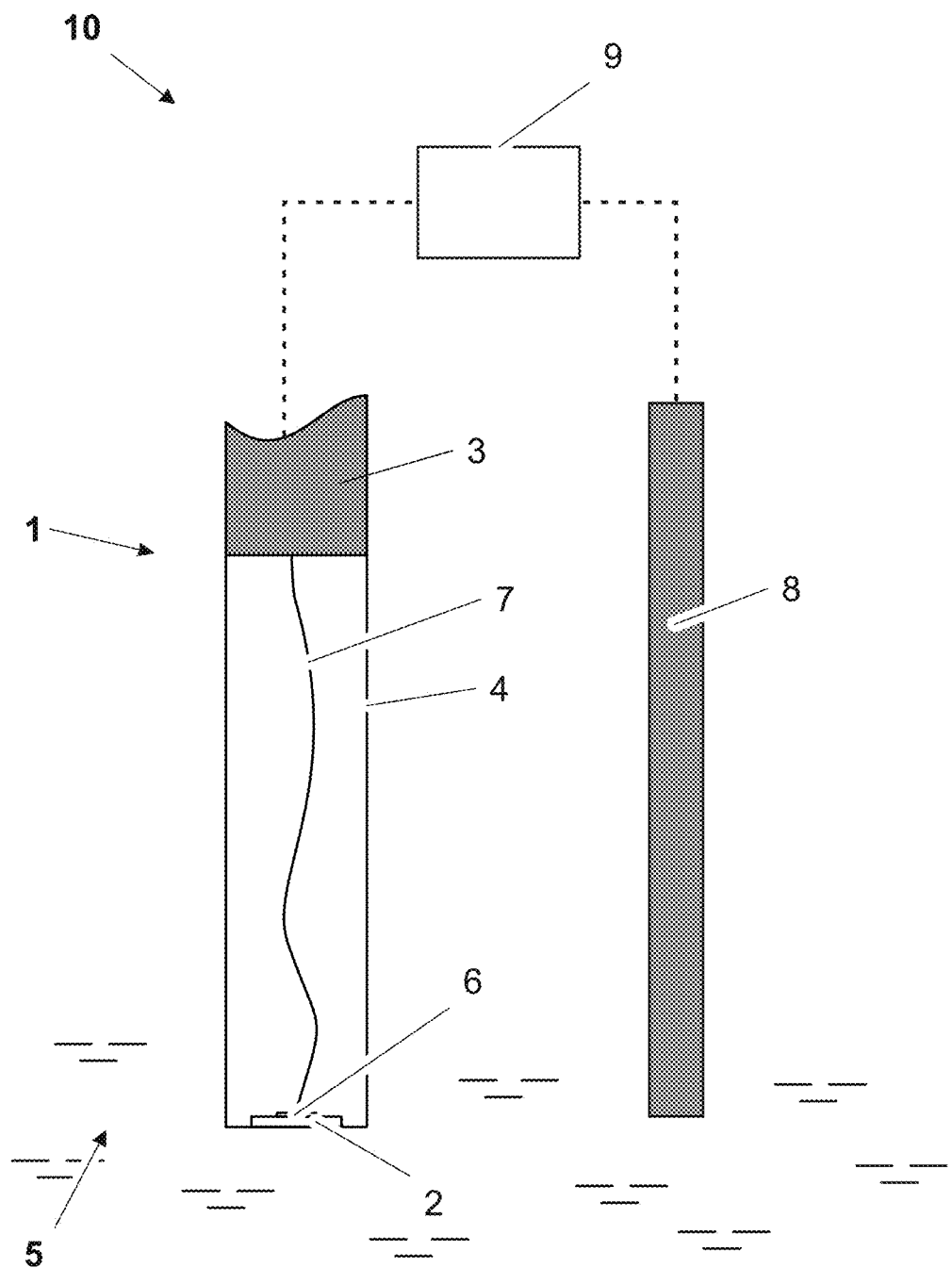
FIG. 1 shows a schematic view of an exemplary electrochemical sensor with an ion-sensitive solid contact electrode having an exemplary measuring element as disclosed herein.

For process plants, exemplary embodiments can provide ion-sensitive solid contact electrodes for measuring ionic activities, wherein such electrodes would be mechanically stabile and suitable for use regardless of position, while having measurement characteristics at least comparable to those of known glass electrodes. In addition, use of an ion-sensitive solid-contact electrode in a process plant or a process environment involves a high thermal stability of the electrode used as well as of a measuring element contained therein in order to minimize influences on the components and/or a resulting measurement signal due to fluctuations in temperature in the process medium and/or the process environment.

A measuring element for an ion-sensitive solid contact electrode is disclosed for measuring ion activity in a measurement medium, the electrode having an ion-sensitive layer, which is in contact with the measurement medium during operation and is conductive for lithium ions, and includes a single-phase electrically conductive layer having metallic lithium or a lithium-(0)-alloy. A measuring element as disclosed herein can be an element, which also includes a solid-state electrolyte layer arranged between the ion-sensitive layer and the electrically conductive layer.

A measuring element as disclosed herein is, for example, a solid-state element, which is robust and free of hysteresis as well as being electrochemically reversible, such as when used in a solid contact electrode for measuring the ion activity in a measurement medium. An exemplary measuring element as disclosed can have thermodynamic stability over a wide temperature range and have little delay time with temperature changes or at least no prolonged delay time.

The ion-sensitive layer includes, for example, an ion-sensitive glass, which is conductive for lithium ions. Such glasses are used as the glass membrane in known ion-sensitive glass electrodes, for example, such as pH electrodes.

An electrically conductive layer having pure lithium or a lithium-(0)-alloy is for example a single-phase solid solution, a solid-state compound or pure substance and has a high lithium concentration or activity. Pure lithium is also referred to herein as metallic lithium. A high lithium activity can ensure that the lithium concentration can be regarded as constant over the lifetime or use period of the measuring element, and thus the measuring element will have a uniform measurement performance. The electrically conductive layer can, for example, advantageously also be homogenous. A measuring element as disclosed herein can include highly active lithium operates close to the standard reduction potential of lithium (Li(solid)→Li+=−3.04 V).

A single-phase lithium-(0)-alloys as disclosed can, for example, in comparison with pure lithium be more stable mechanically and physically, which can facilitate processing and also greatly improve the mechanical stability of the resulting measuring element. Examples of suitable lithium-(0)-alloys include single-phase lithium-magnesium alloys or lithium-copper alloys. Because of their higher lithium concentration, single-phase lithium-rich lithium-magnesium alloys with a cubic body-centered crystal structure can be particularly suitable as the electrically conductive layer.

The solid-state electrolyte layer can include one of the following exemplary Li ion-conducting crystalline or amorphous (vitreous) solid-state compounds or mixtures thereof: lithium borates, including (i.e., such as) B2O3-Li2O, lithium borate-sulfates (LiBSO), such as B2O3-0.8Li2O-0.8Li2SO4, lithium borophosphates (LiOP), such as ½× Li2O—BPO4, Li—O-2O3-P2O5 in general, lithium aluminates, such as Li5AlO4, lithium borosilicates, such as Li2O—B2O3-SiO2, lithium gallium oxides, such as Li5GaO4, lithium germanates, such as Li(4-3x)AlxGeO4, lithium nitrides, lithium phosphates, such as Li(1+x)Ti2SixP(3-x)O12 or Li(1+x)MxTi(2-x)(PO4)3, where M=Al, Ga, Fe, Sc, In, Lu, Y, La, lithium-phosphorus oxynitrides, such as Li3PO4-xNx, lithium-silicate aluminates, such as LiAlSi2O6, LiAlSiO4, Li9SiAlO8, lithium silicates, such as Li2SiO4, Li4SiO4, Li2SiO3, Li2Si2O5, lithium-silicon phosphates, such as Li3.6Si0.6P0.4O4, lithium-silicon-phosphorus oxynitrides, such as Li4SiO4-x-Li3P4-yNx+y, lithium thiogermanates, Li2GeS3, Li4GeS4, Li6GeS5, lithium titanates, such as Li2Zr(1-x)TixO3, lithium vanadates, lithium compounds, such as Li2S-SiS2-Li3PO4 or Li7P3S11, lithium-zinc oxides, such as Li6ZnO4, nitrated lithium borates (Li—B—O—N), such as Li3.09BO2.53N0.52, sulfides, such as Li2S—GeS2, or thio-lithium-germanium compounds, such as Li10GeP2S12, Li3.25Ge0.25P0.75S4.

Exemplary materials suitable for the solid-state electrolyte layer are characterized, those that contain movable lithium ions, are stable with respect to elemental lithium and are nonconductive electrically. The material of the solid-state electrolyte layer can for example form a vitreous matrix and can be deposited by sputtering or comparable methods. Such materials include the aforementioned phosphate, phosphide, oxide, borate, nitride, sulfide and sulfate compounds as well as mixtures thereof containing lithium at least proportionally as a cationic component. These compounds can be modified further to improve the conductivity, for example, by incorporating nitrogen.

The material or the solid-state compound used for the solid-state electrolyte layer is both conductive for lithium ions (Li+) and electrically insulating. Furthermore, the material of the solid-state electrolyte layer can, for example, be as stable as possible with respect to the material of the electrically conductive layer in order to prevent or at least greatly diminish its degradation or destruction. In addition, the solid-state electrolyte layer can serve to delineate the ion-sensitive layer from the electrically conductive layer and thereby prevent destruction or decomposition of the ion-sensitive layer because of the high lithium activity of the electrically conductive layer. In this way, almost all competing interfacial equilibria at the interfaces between the ion-sensitive layer and the electrically conductive layer and/or the interfaces with the solid-state electrolyte layer can be ruled out, which results in a high potential stability and very good reproducibility of the measuring element.

In an exemplary embodiment, the solid-state electrolyte layer includes a lithium-phosphorus oxynitride compound (LiPON), such as Li3PO4-xNx. This can have an advantage that, in addition to its electrochemical properties, it has suitable conductivity properties and can be applied well to the ion-sensitive layer. LiPON is electrically insulating and ionically conductive. Furthermore, a solid-state electrolyte layer designed and configured in this way can prevent the material of the electrically conductive layer from attacking the material of the ion-sensitive layer because of its high lithium activity, such as when using pure lithium. The interface between the electrically conductive layer and the solid-state electrolyte layer can, for example, have a high exchange current density.

The measuring element can also include a protective layer, which is applied to the electrically conductive layer as protection against ambient influences. The protective layer can serve to prevent a reaction between oxygen or humidity from the environment, for example, and the electrically conductive layer. Such a protective layer can be advantageous when, for example, pure lithium or a reactive lithium-based compound is used as the electrically conductive layer.

In an exemplary embodiment the protective layer can include a through glass via wafer, which has at least one through-contacted contact point. Such through-contacted glass wafers (English: through glass via wafer) are distributed commercially by various companies. Use of such through glass via wafers can be advantageous because they provide a hermetically sealed and highly planar packaging material and can also offer major advantages in production of the measuring element, since they can, for example, be processed using the standard methods of MEMS and semiconductor production.

The protective layer can also have a barrier layer, which is arranged between the through glass via wafer and the ion-sensitive layer. The barrier layer can serve to chemically uncouple the through-contact glass wafer from the electrically conductive layer, so that the unwanted chemical reactions between the materials of the electrically conductive layer and the through glass via wafer can be prevented. In addition, the barrier layer can permit a defined adhesion for the wafer bonding process for bonding to the through glass via wafer.

In another exemplary embodiment, the protective layer is designed and configured as a diffusion barrier.

The protective layer and/or the barrier layer can include one or more of the following exemplary materials: glass or vitreous materials, in particular oxidic glass or lithium-phosphorus oxynitride glass and/or metallic or ceramic materials, which are conductive electronically and do not form alloys with lithium, as well as mixtures thereof.

Vitreous materials include, for example, silicon dioxide (SiO2), silicon oxides (SiOx), silicon nitride (Si3N4), silicon nitrides (SiNx), spin-on-glass, silicate glass, phosphosilicate glass, fluorophosphate glass, lime-soda glass and/or borosilicate glass. Examples of metallic or ceramic materials that are electrically conductive but do not form alloys with lithium include chromium, nickel, iron, tantalum, zirconium, titanium, hafnium, and their metal nitrite compounds, metal boride compounds, metal carbide compounds, metal carbonitride compounds as well as mixed materials, such as titanium, zirconium, nitride in particular or related materials.

Furthermore, the measuring element can include a mechanically stable substrate, which serves in particular to stabilize the finished measuring element in order to thereby make it more robust on the whole.

The mechanically stable substrate and the ion-sensitive glass can, for example, have comparable coefficients of expansion. In this way, stresses in the measuring element due to temperature fluctuations in the environment can be minimized or even prevented.

An exemplary mechanically stable substrate preferably can, for example, include one or more of the following materials: metal, steel, ceramic, glass, glass ceramic, polymer compound and fiber composite material. Additional exemplary materials include ceramics, such as zirconium oxide, nickel-iron alloys and/or glass that is used for the production of glass shafts of the known ion-sensitive glass electrodes.

In another exemplary embodiment, the mechanically stable substrate is a circuit board such as one having an adjusted coefficient of expansion. This configuration can be advantageous because, for example, contact points for tapping the sensor signal may be formed.

If a circuit board, such as one having an adjusted expansion coefficient in combination with a through-contact glass wafer is used as the protective layer, then the circuit board can be bonded to the glass wafer by means for adhering such as an ACA adhesive (ACA: anisotropically conductive adhesive). The ACA adhesive is supplied, for example, as ACF tapes (ACF: anisotropically conductive film).

In another exemplary embodiment, the measuring element can also include a temperature sensor, which is embedded in the circuit board, for example, in the form of a meandering gold/platinum path, or it may be applied to the surface of the circuit board as an SMT component (SMT: surface mount technology), for example.

In another exemplary embodiment, the measuring element includes a passivation layer, which covers the protective layer, omitting the contact region, with the passivation layer being arranged between the protective layer and the stable substrate.

A measuring element as disclosed herein can also have an electric contact for tapping the measurement signal, the contact being arranged on or formed in the outer surface of the mechanically stable substrate.

The present disclosure also relates to an ion-sensitive solid contact electrode for measuring an ion activity in a measurement medium using a measuring element as disclosed herein.

In addition, the present disclosure relates to an electrochemical sensor for measuring ion activity in a measuring element and having a reference electrode.

FIG. 1 shows a highly schematic view of an exemplary electrochemical sensor 10 having an ion-sensitive solid-contact electrode 1, having an exemplary measuring element 2 according to the disclosure and having a reference electrode 8. The ion-sensitive solid contact electrode 1 can include an electrode head 3, which in turn includes at least a portion of the electronic measurement system as means by which the electrode is connected to a higher-level display and/or control unit 9, for example, a transmitter. This connection may be either by wire or wireless, for example, inductive. The electrode head 3 is connected to an electrode body 4, in which the measuring element 2 is arranged so that at least a sensitive region is in direct contact with a measurement medium 5. On the surface facing away from the measurement medium 5, the measuring element 2 has a contact 6, for example, a print. A line 7, over which a received measurement signal can be sent to the electrode head 3, is situated between this contact 6 and the electrode head 3.

Figure 2:
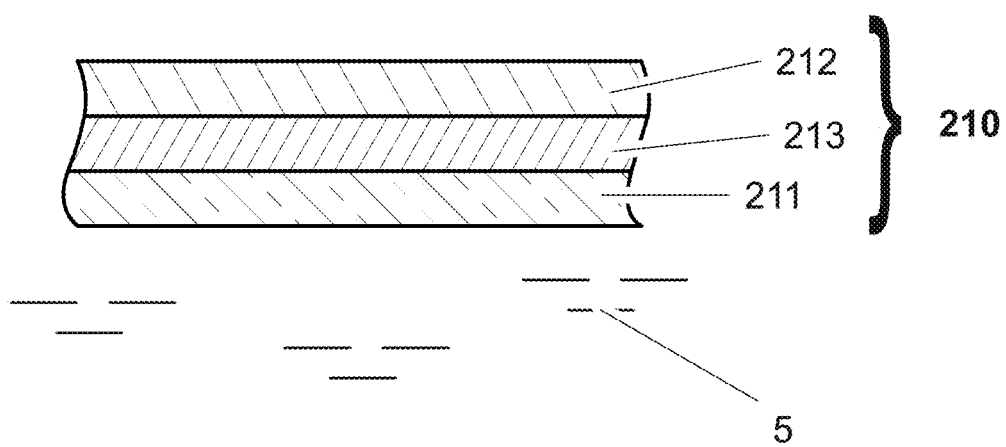
FIG. 2 shows a schematic view of an exemplary ion-sensitive layer structure in a sectional view.

FIG. 2 also shows a highly schematic view of an ion-sensitive layer structure 210 in a sectional view, representing an electrochemical solid-state system as part of a measuring element according to the present disclosure. This layer structure can include an ion-sensitive glass layer 211, an electrically conductive layer 212 and a solid-state electrolyte layer 213 arranged between the glass layer 211 and the electrically conductive layer 212.

In the case of a pH electrode, the glass layer 211 can include a known pH-sensitive glass composition such as that also used as a glass membrane for known pH glass sensors.

The glass layer 211 is, for example, provided as a glass wafer and has an exemplary thickness of between approx. 0.05 mm and approx. 1 mm. In another exemplary embodiment the glass layer 211 can be applied to the solid-state electrolyte layer 213 by sputtering or by any other known thin layer method. During a measurement, at least one sensitive region of a surface of the glass layer 211 is in direct contact with the measurement medium.

A solid-state electrolyte layer 213 is then applied to the surface of the glass layer 211 facing away from the measurement medium. Suitable materials for the solid-state electrolyte layer 213 include lithium-ion-conducting solid-state compounds. Such solid-state compounds include, for example, lithium borates, such as $B_2O_3$-$Li_2O$, lithium borate sulfates (LiBSO), such as $B_2O_3$-$Li_2O$, lithium borate-sulfates (LiBSO), such as $B_2O_3$-$0.8Li_2O$-$0.8Li_2SO_4$, lithium borophosphates (LiOP), such as ½× $Li_2O$—$BPO_4$, Li—O-$2O_3$-$P_2O_5$ in general, lithium aluminates, such as $Li_5AlO_4$, lithium borosilicates, such as $Li_2O$—$B_2O_3$-$SiO_2$, lithium gallium oxides, such as $Li_5GaO_4$, lithium germanates, such as $Li_{(4-3x)}Al_xGeO_4$, lithium nitrides, lithium phosphates, such as $Li_{(1+x)}Ti_2Si_xP_{(3-x)}O_{12}$ or $Li_{(1+x)}M_xTi_{(2-x)}(PO_4)_3$, where M=Al, Ga, Fe, Sc, In, Lu, Y, La, lithium-phosphorus oxynitrides, such as $Li_3PO_4$-$xN_x$, lithium silicate aluminates, such as $LiAlSi_2O_6$, $LiAlSiO_4$, $Li_9SiAlO_8$, lithium silicates, such as $Li_2SiO_4$, $Li_4SiO_4$, $Li_2SiO_3$, $Li_2Si_2O_5$, lithium silicon phosphates, such as $Li_{3.6}Si_{0.6}P_{0.4}O_4$, lithium-silicon-phosphorus oxynitrides, such as $Li_4SiO_4$-x-$Li_3P_4$-$yN_{x+y}$, lithium thiogermanates, $Li_2GeS_3$, $Li_4GeS_4$, $Li_6GeS_5$, lithium titanates, such as $Li_2Zr_{(1-x)}Ti_xO_3$, lithium vanadates, lithium compounds, such as $Li_2S$-$SiS_2$-$Li_3PO_4$ or $Li_7P_3S_{11}$, lithium-zinc oxides, such as $Li_6ZnO_4$, nitrated lithium borates (Li—B—O—N), such as $Li_{3.09}BO_{2.53}N_{0.52}$, sulfides, such as $Li_2S$—$GeS_2$, and thio-lithium-germanium compounds, such as $Li_{10}GeP_2S_{12}$, $Li_{3.25}Ge_{0.25}P_{0.75}S_4$ or mixtures thereof.

In an exemplary embodiment, the solid-state electrolyte layer 213 can include an alkali metal solid-state electrolyte compound, such as a lithium phosphorus oxide nitride compound (LiPON), which is applied by sputtering, for example. Additional methods suitable for applying the solid-state electrolyte layer 213 include various thin layer methods including among others: pulsed laser deposition, magnetron sputtering, reactive magnetron sputtering, CVD, vapor deposition, reactive vapor deposition, sol-gel methods and plasma-assisted coating methods, such as plasma assisted CVD or vacuum plasma spraying. The solid-state electrolyte layer 213 can have an exemplary layer thickness between approx. 50 nm and approx. 5000 nm, for example a layer thickness of approx. 100 nm to approx. 1000 nm.

Next, a single-phase electrically conductive layer 212 is applied to the solid-state electrolyte layer 213 containing pure lithium or an alloy containing lithium-(0). An exemplary layer thickness of the electrically conductive layer 212 is between approx. 10 nm and approx. 10 μm. The single-phase, electrically conductive layer 212 is for example preferably a solid solution, a solid-state compound or pure substance and has a high lithium concentration or activity. Examples of suitable lithium-(0)-alloys include single-phase lithium-magnesium alloys or lithium-copper alloys. Because of their higher lithium concentration, lithium-rich single-phase lithium-magnesium alloys with a cubic body-centered crystal structure are suitable as the electrically conductive layer. The electrically conductive layer is also, for example, homogenous.

A measurement principle of an electrochemical electrode with a measuring element according to the present disclosure is based on an ionic reaction of the measurement medium with the ion-sensitive glass layer 211. The solid-state electrolyte layer 213 is also ion conductive and also allows a reversible redox reaction to take place between ionic and metallic lithium (Li(0)) at the interface between the solid-state electrolyte layer 213 and the electrically conductive layer 212, so that a measurement signal can be picked up by a suitable electrical contact at the electrically conductive layer 212.

The exemplary layer structure 210 shown in FIG. 2 thus constitutes an actual electrochemical solid-state measurement system, which has been found in particular to be hysteresis-free and fully reversible electrochemically in application. Furthermore, this system has a high exchange current density at the interface between the electrically conductive layer 212 and the solid-state electrolyte layer 213 and is thermodynamically stable, at least at temperatures between, for example, approx. −40° C. and more than +150° C., which corresponds to a typical temperature range for use of pH sensors.

Figure 3:
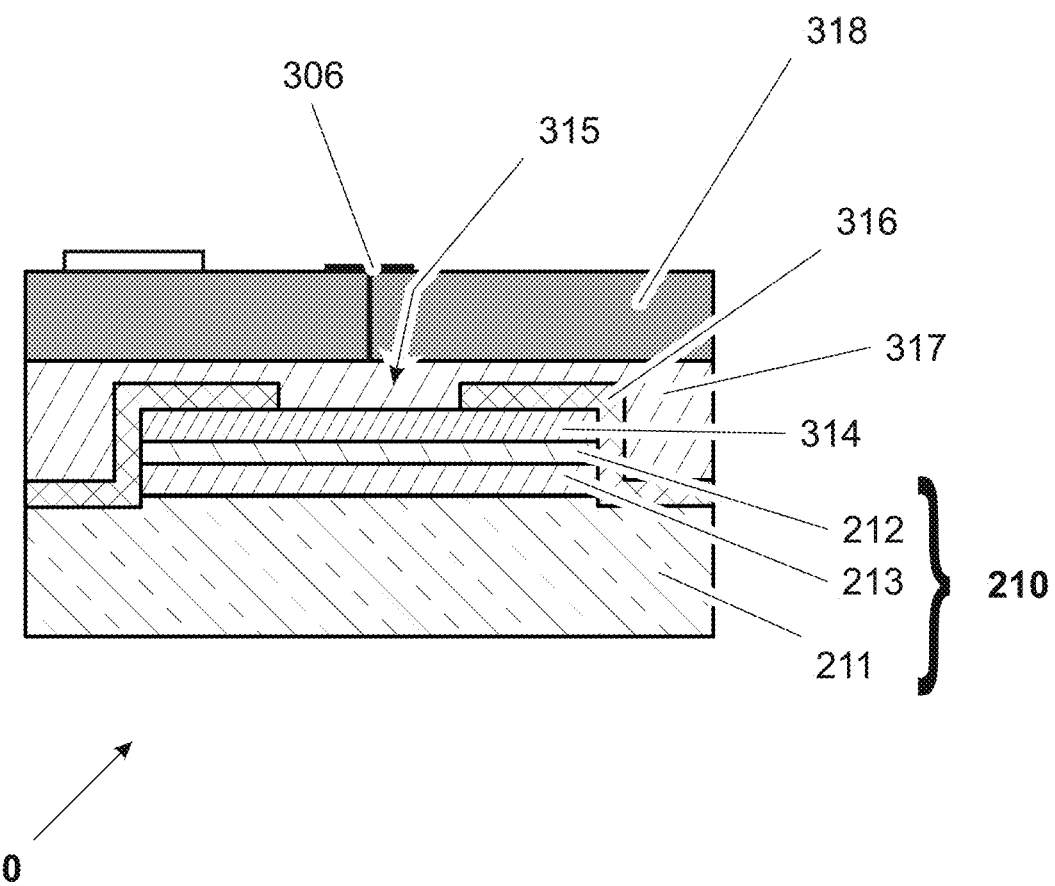
FIG. 3 shows a schematic view of an exemplary measuring element as disclosed herein, and having an ion-sensitive layer structure according to FIG. 2 shown in cross section.

FIG. 3 shows schematically an exemplary measuring element 300 according to the present disclosure with an ion-sensitive layer structure 210 according to FIG. 2 in a sectional view. The measuring element 300 can include an ion-sensitive glass layer 211, which is a thin glass wafer of an ion-sensitive glass, for example, such as a pH-sensitive glass. The solid-state electrolyte layer 213 and an electrically conductive layer 212 are applied to this glass layer 211 by one of the aforementioned methods. Depending on the embodiment of the electrically conductive layer 212, should be protected from environmental influences. Metallic lithium or pure lithium, for example, is highly reactive and is oxidized even by atmospheric oxygen or humidity, which can result in destruction of the measuring element. The measuring element 300 shown here therefore has a diffusion barrier as a protective layer 314, covering the entire surface of the electrically conductive layer 212. The diffusion barrier 314 may have one or more of the following exemplary materials or compounds: glass, vitreous materials, such as silicon dioxide ($SiO_2$), silicon oxides ($SiO_x$), silicon nitride ($Si_3N_4$), silicon nitrides ($SiN_x$), spin-on glass, silicate glass, phosphosilicate glass, fluorophosphate glass, lime-soda glass and/or borosilicate glass or oxidic glasses with suitable properties. Also possible are LiPON and related materials, metallic as well as ceramic layers of electronically conductive materials that do not form an alloy with lithium, such as, for example, chromium, nickel, iron, tantalum, zirconium, titanium, hafnium as well as their metal nitrides, metal borides, metal carbides, metal carbonitrides as well as mixtures thereof, such as titanium zirconium nitride or related materials.

In an exemplary embodiment, the diffusion barrier 314 is applied, for example, via a reactive magnetron sputter process. In addition, or alternately, the diffusion barrier 314 can be applied by any of the following exemplary methods: lamination methods, anhydrous sol-gel coating, spin coating, plasma spraying, vacuum plasma spraying, sputtering, CVD or PVD methods, such as vapor deposition, reactive vapor deposition, ion beam-assisted deposition, ion plating or pulsed laser deposition.

As FIG. 3 shows, the exemplary solid-state electrolyte layer 213, the electrically conductive layer 212 and the diffusion barrier 314 do not cover the entire surface of the glass layer 211, and furthermore, they are covered with a passivation layer 316 except for a contact region 315. The passivation layer 316 serves as additional protection for the electrically conductive layer 212 and can include, for example, one or more of the following compounds: metal, in particular steel, ceramic, glass, glass ceramic, polymer compound, fiber composite material or combinations thereof.

The layer structure created to this extent can be bonded to a mechanically stable substrate 318 by means for adhering, such as a conductive adhesive 317. The mechanically stable substrate 318 can include, for example, one or more of the following compounds: metal, in particular steel, ceramic, in particular zirconium dioxide or nickel-iron alloys, glass, glass ceramics, polymer compounds, fiber composite materials or circuit boards, wherein the mechanically stable substrate 318 preferably has an expansion coefficient comparable to that of the ion-sensitive glass layer 211. Exemplary expansion coefficients of substrate 318 and of glass layer 211 preferably do not differ from one another by more than for example approx. 10% in order to ensure enhanced thermal stability of the measuring element.

The measurement signal is tapped via a contact 306, which is formed on or attached to the surface of the substrate 318 (see also FIG. 1).

In addition, the measuring element can include a temperature sensor 32, which is attached to the substrate 318 as an SMT component, as illustrated here.

Figure 4:
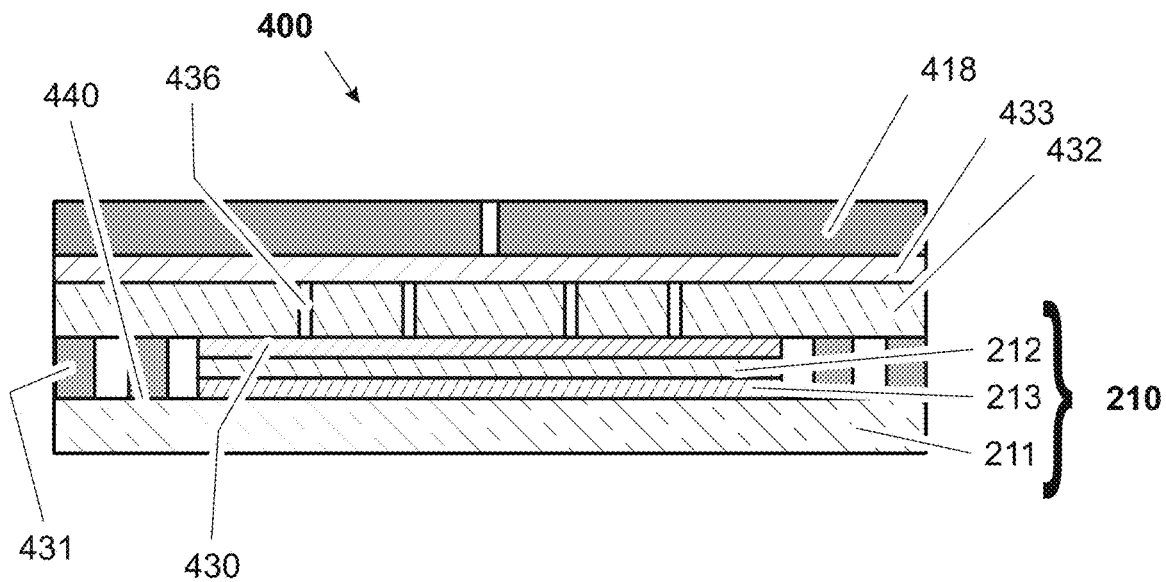
FIG. 4 shows a schematic view of another exemplary measuring element as disclosed herein, and having an ion-sensitive layer structure according to FIG. 2 shown in cross section.

FIG. 4 shows another exemplary embodiment of a measuring element 400 according to the present disclosure having a layer structure 210. The layer structure 210 includes an ion-sensitive glass layer 211, which in this embodiment includes (e.g., consists of) a pH-sensitive glass and is for example approx. 200-µm thick. The glass layer 211 is covered with a solid-state electrolyte layer 213 to, for example, approx. 1000 µm, except for a peripheral border area 440 of for example approx. 200 µm, and this layer is then covered completely with an electrically conductive layer 212. The solid-state electrolyte layer 213 here can include a lithium-phosphorus oxide nitride compound in a thickness of, for example, approx. 1000 nm and the electrically conductive layer 212 can include pure metallic lithium in a thickness of for example approx. 1000 nm.

In an exemplary embodiment, the electrically conductive layer 212 is covered completely by a barrier layer as the protective layer 430, which in this embodiment is applied to a through glass via wafer 432. This barrier layer 430 can also serve as a contact layer between the electrically conductive layer 212 and the through glass via wafer 432, which here includes a plurality of through-contacted contact points 436.

Through glass via wafers are available commercially from various providers. The glass wafer 432 is connected to the layer structure 210 via the barrier layer 430 and a bonding metallization 431, which contacts the peripheral bordering edge 440 of the ion-sensitive glass layer 211. The barrier layer 430 and the bonding metallization 431, for example, includes one of the following metals or metal compounds containing these metals: titanium, chromium, nickel, gold, platinum.

Furthermore, a circuit board, which is also referred to as a PCB (printed circuit board), is applied as a mechanically stable substrate 418 by means for adhering, such as an adhesive layer 433, namely ACA adhesive here (ACA: anisotropically conductive adhesive). The circuit board is, for example, a CTE-matched PCB (CTE: coefficient of thermal expansion), in which the coefficient of thermal expansion of the circuit board is adapted to that of the ion-sensitive glass 211. A measurement signal occurring on the basis of the interaction of a measurement medium with the ion-sensitive glass membrane 211 can be picked up by a contact region (not shown here) (see FIGS. 1 and 3).

Figure 5:
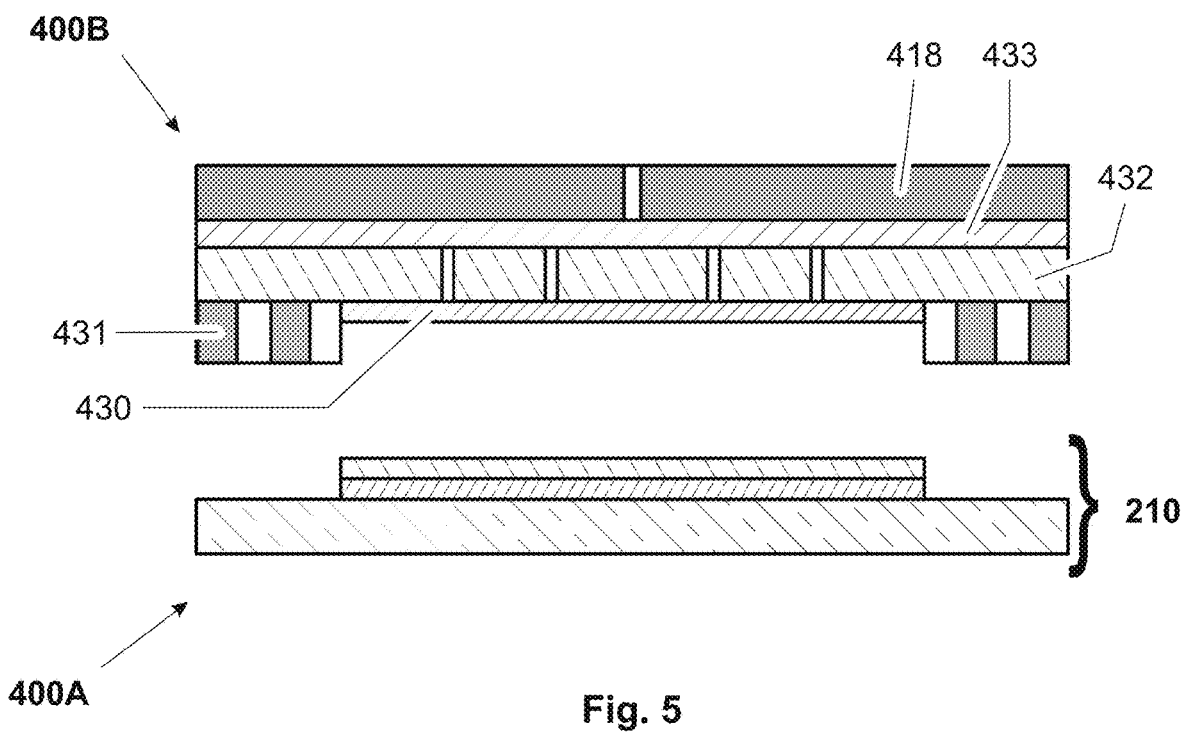
FIG. 5 shows a schematic view of exemplary two components of the measuring element according to FIG. 4.

FIG. 5 shows an exemplary measuring element 400 according to FIG. 4 in the form of two modules 400A and 400B, wherein module 400A includes essentially the layer structure 210, and the module 400B can include the mechanically stable substrate 418 with the barrier layer 430, the adhesive layer 433, the through glass via wafer 432 and the bonding metallization 431. As shown here in a highly schematic form, the modules 400A and 400B are created essentially independently of one another and only then are bonded together. This can be advantageous, so that production rejects in particular can be greatly reduced by producing module 400A, which is more sensitive to environmental influences, independently of module 400B.

Figure 6:
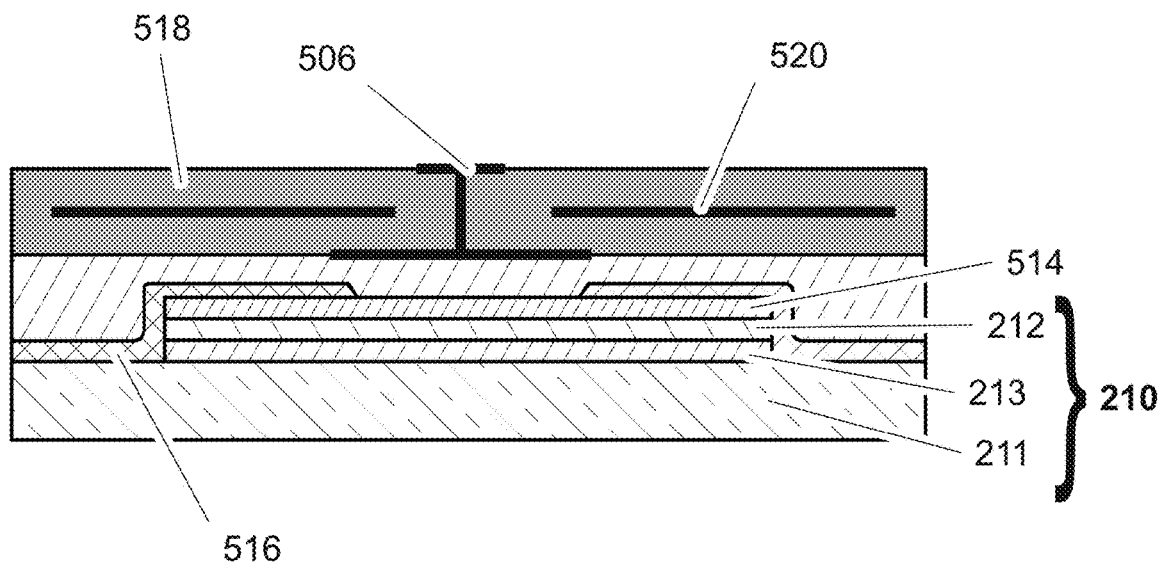
FIG. 6 shows a schematic view of another exemplary measuring element as disclosed herein, and having an ion-sensitive layer structure according to FIG. 2 shown in cross section.

FIG. 6 shows another exemplary measuring element 500 according to the present disclosure with an ion-sensitive layer structure 210, which is constructed like the measuring unit 300 (see FIG. 3). The electrically conductive layer 212 is covered with a diffusion barrier as the protective layer 514, which is also covered by an insulator layer 516, omitting a contact region, like the peripheral border of the glass layer 211. In this case, a circuit board with a thermal expansion coefficient CTE of for example approx. 10 ppm/K as a mechanically stable substrate 518 is bonded to the insulator layer 516 by means for adhering, such as an ACF tape (ACF: anisotropically conductive film). Furthermore, a contact 506 for picking up the measurement signals can be formed in the mechanically stable substrate 518. The measuring element 500 also can include a temperature sensor 520, which is formed in the substrate 518.

Figure 7A:
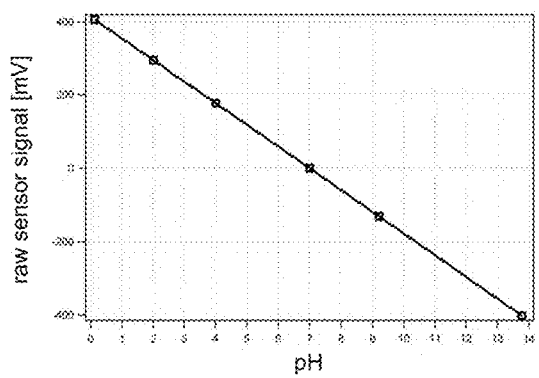
FIG. 7A shows exemplary measurement signals of a known glass sensor with respect to an Ag/AgCl reference electrode at 25° C.
Figure 7B:
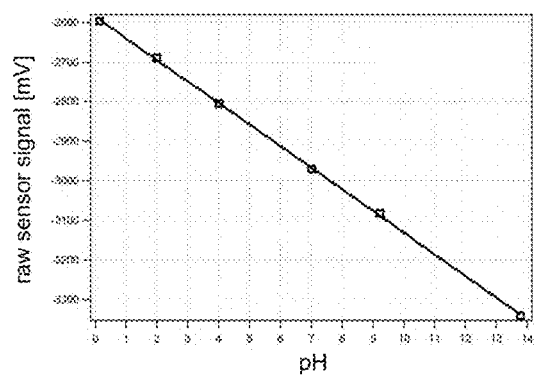
FIG. 7B shows exemplary measurement signals of a sensor as disclosed herein with respect to an Ag/AgCl reference electrode at 25° C.

FIG. 7 shows a comparison of the raw data of known measurement signals (raw sensor signal) of a known glass sensor and an ion-sensitive solid contact electrode according to the present disclosure at 25° C. and different pH levels. The measurement signals were determined with respect to an Ag/AgCl reference electrode, wherein FIG. 7A shows the theoretical values for a known glass sensor, and FIG. 7B shows the values measured with an ion-sensitive solid-contact electrode according to the present disclosure.

FIG. 7B shows that the measured potential of an ion-sensitive solid-contract electrode according to the present disclosure is in a linear ratio with respect to the pH level with a Nernst slope. In comparison with the known glass sensor (see FIG. 7A), the measurement signals of the ion-sensitive solid-contact electrode (see FIG. 7B) have a somewhat lower slope of 59.1 mV/pH at 25° C. This can, for example, be attributed to the experimental circumstances. Furthermore, the offset potential of the ion-sensitive solid-contact electrode differs from that of a glass sensor and is for example approx. −2980 mV in comparison with approx. 0 mV with a known glass sensor. This deviation can be attributed mainly to the asymmetry of the ion-sensitive solid contact electrode.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMERALS 1 electrode
2 measuring element
3 electrode head
4 electrode body
5 measurement medium
6, 306, 506 contact
7 line
8 reference electrode
9 display/control unit
10 electrochemical sensor
210 layer structure
211 ion-sensitive layer
212 electrically conductive layer
213 solid-state electrolyte layer
300, 400 measuring element
314, 514 protective layer/barrier layer
315 contact region
316, 516 passivation layer
317 adhesive layer
318, 418, 518 substrate
320, 520 temperature sensor
430 barrier layer/protective layer
431 bonding metallization
432 glass wafer
433 adhesive layer
436 contact point
440 boundary area

What is claimed is:

1. A measuring element for an ion-sensitive solid-contact electrode for measuring ion activity in a measurement medium, the measuring element comprising:
an ion-sensitive layer, arranged to contact the measurement medium when in operation, and conductive for lithium ions; and a single-phase electrically conductive layer which includes metallic lithium or a lithium-(0)-alloy, wherein the measuring element is a solid-state measuring element which includes a solid-state electrolyte layer arranged between the ion-sensitive layer and the single-phase electrically conductive layer.

2. The measuring element according to claim 1, wherein the ion-sensitive layer comprises an ion-sensitive glass.

3. The measuring element according to claim 1, wherein the lithium-(0)-alloy of the single-phase electrically conductive layer is a single-phase lithium-magnesium alloy, a lithium-copper alloy or a mixture thereof.

4. The measuring element according to claim 3, wherein the lithium-(0)-alloy is a lithium-rich single-phase lithium-magnesium alloy with a cubic body-centered crystal structure.

5. The measuring element according to claim 1, wherein the solid-state electrolyte layer comprises one of the following:
Li-ion-conducting solid-state compounds or mixtures thereof;
any lithium borates, including $B_2O_3$-$Li_2O$;
any lithium borate-sulfates (LiBSO), including $B_2O_3$-$0.8Li_2O$-$0.8Li_2SO_4$;
any lithium borophosphates (LiOP), including ½x$Li_2O$—$BPO_4$, Li—O-$2O_3$-$P_2O_5$;
any lithium aluminates, including $Li_5AlO_4$;
any lithium borosilicates, including $Li_2O$—$B_2O_3$-$SiO_2$;
any lithium gallium oxides, including $Li_5GaO_4$;
any lithium germanates, including $Li_{(4-3x)}Al_xGeO_4$;
any lithium nitrides;
any lithium phosphates, including $Li_{(1+x)}Ti_2Si_xP_{(3-x)}O_{12}$ or $Li_{(1+x)}M_xTi_{(2-x)}(PO_4)_3$
where M=Al, Ga, Fe, Sc, In, Lu, Y, La;
any lithium-phosphorus oxynitrides, including $Li_3PO_4$-$xN_x$;

any lithium-silicate aluminates, including LiAlSi2O6, LiAlSiO4, Li9SiAlO8;
any lithium silicates, including Li2SiO4, Li4SiO4, Li2SiO3, Li2Si2O5;
any lithium-silicon phosphates, including Li3.6Si0.6P0.4O4;
any lithium-silicon-phosphorus oxynitrides, including Li4SiO4-x-Li3P4-yNx+y;
any lithium thiogermanates;
any Li2GeS3, Li4GeS4, Li6GeS5;
any lithium titanates, including Li2Zr(1-x)TixO3;
any lithium vanadates;
any lithium sulfur compounds or any lithium phosphorus compounds;
any lithium-zinc oxides, including Li6ZnO4;
any nitrated lithium borates (Li—B—O—N), including Li3.09BO2.53N0.52;
any lithium sulfides, including Li2S—GeS2; or
any thio-lithium-germanium compounds, including Li10GeP2S12, Li3.25Ge0.25P0.75S4.

6. The measuring element according to claim 5, wherein the solid-state electrolyte layer comprises:
any lithium-phosphorus oxynitride compound, including Li3PO4-xNx.

7. The measuring element according to claim 1, wherein the measuring element comprises:
a protective layer applied to the single-phase electrically conductive layer as protection against environmental influences.

8. The measuring element according to claim 7, wherein the protective layer comprises:
a through glass via wafer having at least one through contact point via.

9. The measuring element according to claim 8, wherein the protective layer comprises:
a barrier layer arranged between the through glass via wafer and the single-phase electrically conductive layer.

10. The measuring element according to claim 7, wherein the protective layer is a diffusion barrier.

11. The measuring element according to claim 1, wherein a protective layer and/or a barrier layer comprises at least one of the following materials:
glasses, glassy materials, oxidic glass, lithium-phosphorous oxynitride compounds and/or metallic or ceramic materials, which are electronically conductive and do not form alloys with lithium, as well as mixtures thereof.

12. The measuring element according to claim 1, wherein the measuring element comprises:
a mechanically stable substrate, wherein the mechanically stable substrate and the ion-sensitive layer have similar expansion coefficients.

13. The measuring element according to claim 12, wherein the mechanically stable substrate comprises:
one or more of the following materials: metal, steel, ceramic, glass, glass ceramics, polymer compound, or fiber composite material.

14. The measuring element according to claim 12, wherein the mechanically stable substrate is a circuit board.

15. The measuring element according to claim 12, comprising:
an electric contact for picking up a measurement signal, said electric contact being arranged on or formed in an outside surface of the mechanically stable substrate.

16. The measuring element according to claim 1, comprising:
a temperature sensor.

17. The measuring element according to claim 1, comprising:
a passivation layer which covers a protective layer, omitting a contact region, with the passivation layer being arranged between the protective layer and a mechanically stable substrate.

18. An ion-sensitive solid-contact electrode for measuring ion activity in a measurement medium comprising the measuring element according to claim 1.

19. An electrochemical sensor for measuring ion activity in a measurement medium comprising:
the ion-sensitive solid-contact electrode according to claim 18; and
a reference electrode.

* * * * *